United States Patent [19]
McMurtrie

[11] 3,897,119
[45] July 29, 1975

[54] LINEAR BEARING SLIDE

[75] Inventor: Thomas McMurtrie, Medfield, Mass.

[73] Assignee: Design Components, Inc., Medfield, Mass.

[22] Filed: Nov. 23, 1973

[21] Appl. No.: 418,368

Related U.S. Application Data

[63] Continuation of Ser. No. 194,133, Nov. 1, 1971.

[52] U.S. Cl. ............................... 308/6 R; 308/3 A
[51] Int. Cl. ........................................... F16c 17/00
[58] Field of Search ............. 308/3.8, 6 R, 3 A, 216

[56] References Cited
UNITED STATES PATENTS

| | | | |
|---|---|---|---|
| 2,549,356 | 4/1951 | Zalkind | 308/215 |
| 2,672,378 | 3/1954 | McVey | 308/6 C |
| 2,929,661 | 3/1960 | Brown | 308/6 C |
| 3,044,835 | 7/1962 | Hurd | 308/6 C |
| 3,113,807 | 12/1963 | Polidor | 308/6 R |
| 3,145,065 | 8/1964 | Cator | 308/6 R |
| 3,236,569 | 2/1966 | Moosmann | 308/6 R |
| 3,361,500 | 1/1968 | Pohler | 308/216 |
| 3,790,233 | 2/1974 | Polidor | 308/6 R |

FOREIGN PATENTS OR APPLICATIONS

| | | | |
|---|---|---|---|
| 1,331,533 | 5/1963 | France | 308/6 C |

*Primary Examiner*—Charles J. Myhre
*Assistant Examiner*—R. H. Lazarus
*Attorney, Agent, or Firm*—John E. Toupal

[57] ABSTRACT

A slide supported on a base by two linear bearings which are each comprised of at least two partially flattened round rods at diagonally opposed corners in the slide and base, the flat parts of the rods providing self adjusting raceways for roller bearings spaced therealong between the rods, each roller bearing on the flats of the diagonally positioned rods. A slide which can bear loads in any direction has pairs of such rods positioned at diagonal corners of a square providing self adjusting raceways for two sets of roller bearings in line, one set bearing on the flats of one diagonal pair of rods and the other set bearing on the flats of the other pair of diagonal rods.

6 Claims, 6 Drawing Figures

LINEAR BEARING SLIDE

CROSS-REFERENCE TO RELATED APPLICATION

This is a continuation of my co-pending U.S. application Ser. No. 194,133 filed Nov. 1, 1971, and entitled Linear Bearing Slide.

BACKGROUND OF THE INVENTION

This invention relates to linear slides and more particularly to a linear slide having one member which slides on another, one of the members being bifurcated and straddling the other with linear bearings on each side of the straddled member connecting it to the bifurcations of the other member.

Linear slides generally include a bifurcated member straddling another. Either member can be fixed and the other slides with respect to it on two linear bearings sandwiched between the fiburcations of the one member and the sides of the straddled member. Heretofore, each of the linear bearings has included a pair of opposing raceways, one carried by one member and the other carried by the other, with a set of balls riding in each pair of raceways. Means are provided in one of the members for preloading the balls in the raceways so that lateral motion of one member with respect to the other in a direction transverse to the direction of slide is prohibited. This preload is usually adjustable to compensate for wear between the balls and raceways.

One prior structure places four longitudinally running rods in each raceway. Two of the rods carried by one member and two by the other member. The balls ride on all four rods in the raceway and preload is applied by adjusting the longitudinal position of a tapered jib that rides in a tapered slot in one of the members and bears against two of the rods in one of the raceways carried by the same member. In operation, the ball bearings are subjected to loads in both orthogonal directions which are transverse to the direction of slide. For example, if the direction of slide is horizontal, forward and back, the balls may be subject to left and right horizontal loads and up and down vertical loads. This tends to simultaneously rotate each ball about a vertical axis and a horizontal axis and since this cannot be done, the result is that the balls slip for one load or the other and so the balls and rods wear. The rods which provide the raceway tracks in each linear bearing can be replaced to renew the track and so the use of rods in this manner to provide tracks has been of some advantage. However, a replacement of worn ball bearings is more costly.

It is one object of the present invention to provide a linear bearing slide with renewable raceways and bearings that do not slip against any part of the raceway when the slide is subject to simultaneous orthogonal transverse loads.

It is another object to provide a linear slide with bearings in raceway tracks such that each bearing in each raceway carries loads in only one direction.

It is another object to provide such a linear bearing wherein some bearings carry loads in one transverse direction only and other bearings therein carry loads in the perpendicular transverse direction only and so the likelihood of any particular bearing slipping in the raceway is reduced.

It is a more particular object of the present invention to provide a linear bearing of roller bearings riding on readily replaceable self adjusting tracks.

It is a further object of the present invention to provide in combination with the roller bearings riding on replaceable self adjusting tracks means foro preloading the bearing transverse to the direction of slide including a least one tapered jib in a slot along the bearing in one of the members of the slide such that none of the faces of the slot are tapered and all said faces are parallel to the direction of slide.

It is another object of the present invention to provide a structure for preloading the bearings in a linear slide which does not require a tapered slot in either of the members of the slide.

DESCRIPTION OF THE DRAWINGS

The various features of the present invention whereby the above stated objects are carried out are incorporated in the embodiments of the invention described herein which represents the best known uses of these features of the invention. These and other objects of the invention will appear from the following specific description of the embodiments taken in conjunction with the figures in which.

DESCRIPTION OF THE PREFERRED EMBODIMENT

Figure 1:
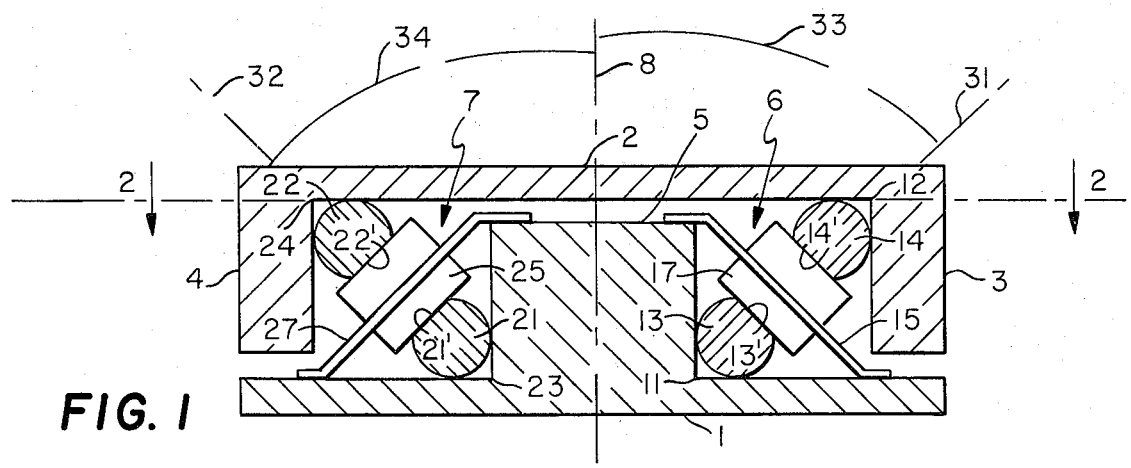
FIG. 1 is an end elevation section view of a linear slide with a single set of rods and rollers in each linear bearing.
Figure 2:
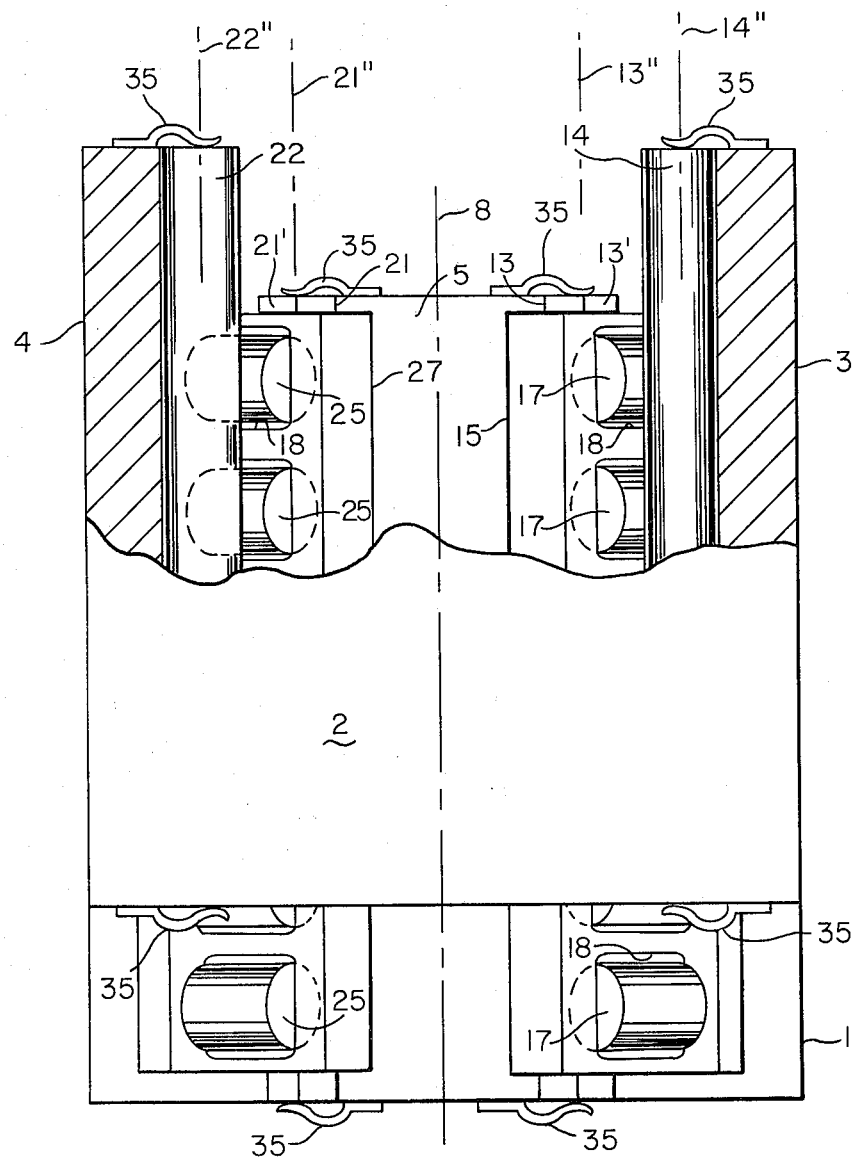
FIG. 2 is a top section view of the slide in FIG. 1.

A linear bearing slide with self adjusting raceways and roller bearings is shown in FIGS. 1 and 2. FIG. 2 is partly broken away to reveal the details of the linear bearings. The slide consists of a base member 1 and a slide member 2 which is bifurcated in that two legs 3 and 4 of the slide member straddle the pedestal 5 at the center of the base member. The linear bearings 6 and 7 are contained between the pedestal 5 of the base member and the two legs 3 and 4, respectively, of the slide member. The linear bearings 6 and 7 are identical in all respects and differ only in that one is a mirror image of the other with respect to the plane 8 through the center of the slide.

Linear bearing 6 is defined by diagonally opposed V grooves 11 and 12 in the base member and slide member, respectively. Within these grooves, at the corners are contained the bearing rods 13 and 14 which provide self adjustable raceways. A plurality of roller bearings such as 17 ride on flat surfaces 13' and 14' of the diagonally opposed rods 13 and 14, respectively. A cage or keeper 15 is provided to space the roller bearings which fit loosely in holes 18 in the cage. These are holes slightly wider and longer than the rollers spaced along a flat piece of material that forms the cage, the bearings fitting loosely in the holes. The cage may be attached to the base or slide member or it may "float"

and be limited by stops carried by the base or slide. In this embodiment, the cage is attached to the base member.

Linear bearing 7 is similar to linear bearing 6. It contains rods 21 and 22 in diagonally opposed V grooves 23 and 24, respectively. Roller bearings 25 ride on flat surfaces 21' and 22' of diagonally opposed rods 21 and 22, respectively, and are spaced by keeper 27 constructed substantially as keeper 15.

The rods, rollers, and cages in the linear bearings 6 and 7 are all identical and interchangeable and these bearings are mirror images with respect to the center plane 8. The axes of the rods in bearings 6 and 7 define planes 31 and 32 which form equal angles 33 and 34 with plane 8. This angle is between zero and 45°. In the embodiment shown, it is 45°. The rods are held in place by clips 35 at the ends of the base and slide and can be removed and replaced without removing the other parts of the bearing.

In operation, the weight of the slide causes the rollers in each bearing to contact the flat surfaces on the diagonal rods. The force of the rollers against the flat surface on each rod rotates the rod on its axis, if necessary, to make the diagonal flat surfaces parallel and so these raceway surfaces adjust in use to provide parallel raceways for the rollers. The rod flat surface is sufficiently wide so that contact of the roller with an edge of the flat surface exerts a torque on the rod about its axis which easily turns the rod in its V groove.

The linear slide shown in FIGS. 1 and 2 cannot carry loads tending to pull the base and slide apart. It carries loads having a net tendency to force the base and slide together. Furthermore, the bearings cannot be preloaded laterally. The only preload is the weight of the slide on the base. The embodiment illustrated by FIGS. 3 to 6 includes two sets of rods and roller bearings in each linear bearing. It can carry loads in any direction and the bearings can be preloaded laterally. This structure is shown in FIG. 6 which is a three-quarter view of the slide slightly broken away to reveal the details of one of the linear bearings. The slide consists of a base member 51 and a slide member 52 which is bifurcated in that two legs 53 and 54 of the slide member straddle the pedestal 55 at the center of the base member. The linear bearings 56 and 57 are contained between the pedestal 55 of the slide member. The linear bearings 56 and 57 are identical in many respects and different only in that one makes connection with a mechanism for preloading the bearings. This mechanism may be contained in either the base member of the slide member and preferably exerts a force between the two such that both the linear bearings 56 and 57 are preloaded by adjustment of the mechanism. The preload mechanism may consist of a tapered jib in a slot alongside of one of the raceways and contained in the base member so that longitudinal adjustment of the position of the jib in the slot adjusts the preload on both the linear bearings.

Figure 3:
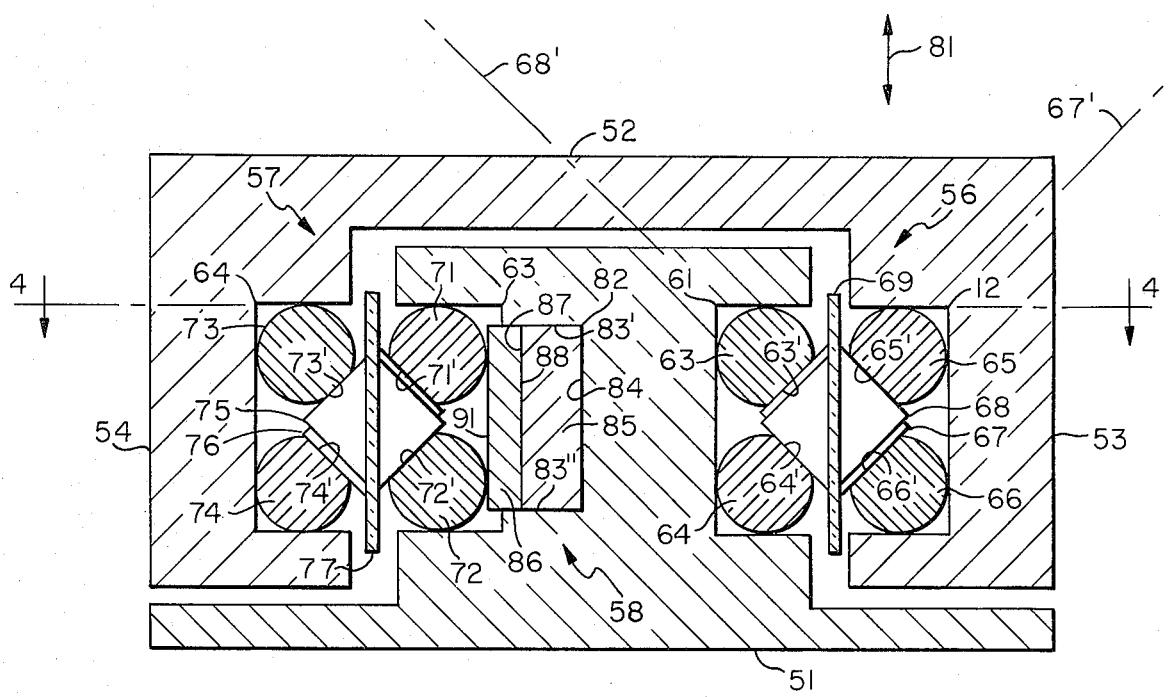
FIG. 3 is an end elevation section view of a linear slide with two sets of rods and rollers in each linear bearing.
Figure 4:
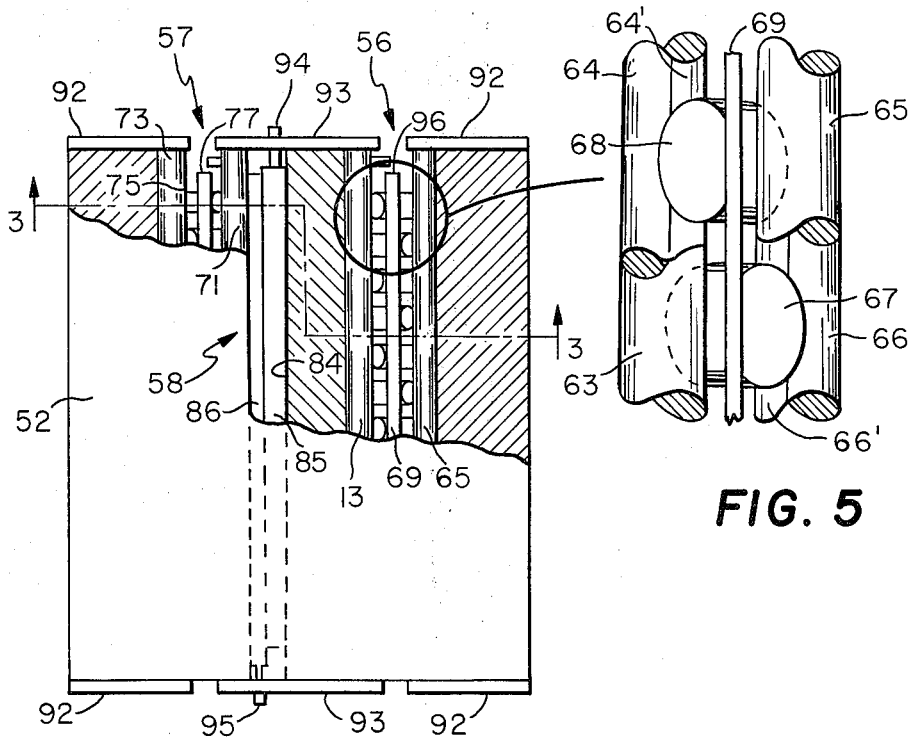
FIG. 4 is a top view partly in section of the linear slide shown in FIG. 3 at half the scale thereof.
Figure 5:
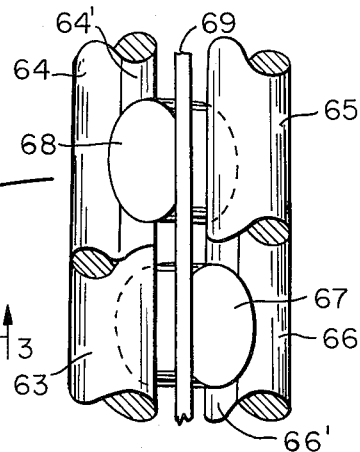
FIG. 5 is an enlarged portion of FIG. 4 showing two adjacent roller bearings in a raceway from the top on the same scale as FIG. 3.
Figure 6:
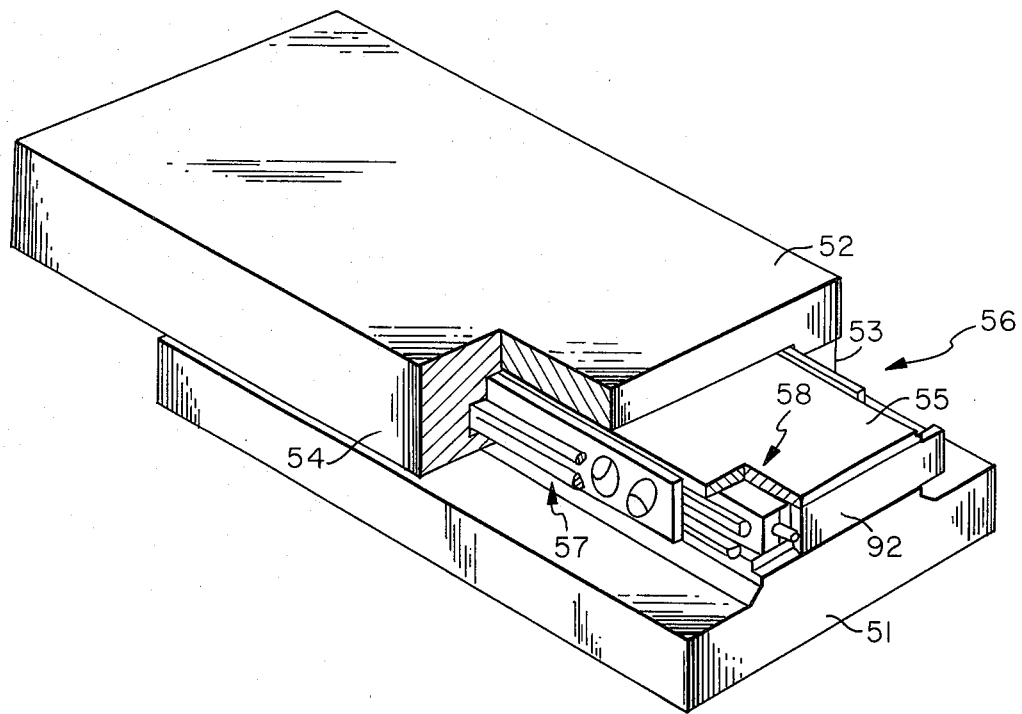
FIG. 6 is a three-quarter view of the linear slide shown in FIGS. 3 to 5, partially broken away illustrating the external appearance of the slide and some of the inside parts.

FIGS. 3 to 5 show front and top sectional views of this linear slide revealing details of the linear bearings and the preload mechanism. Linear bearing 56 is defined by opposing channels in the pedestal of the base member and leg of the slide member, respectively. Within these channels at the corners are contained the bearing rods 63 and 64 in channel 61 and 65 and 66 in channel 62. A plurality of roller bearings such as 67 and 68 ride on flat surfaces of the rods 63 to 66. The roller bearings 67 oriented in one direction ride on the flat surfaces 63' and 66' of the diagonally opposed rods 63 and 66, respectively. Similarly, the roller bearings 68 oriented perpendicular thereto ride on the flat surfaces 64' and 65' of the diagonally opposed rods 64 and 65, respectively. A cage or keeper 69 is provided to space the roller bearings 67 and 68, the bearings fitting loosely in holes in the cage. These may be oblong holes spaced along a flat piece of material that forms the cage, the bearings fitting loosely in the holes. The function of these holes is to space the bearings.

Linear bearing 67 is similar in that it contains rods 71 to 74 in positions corresponding to rods 63 to 66, respectively. Roller bearings 75 oriented in one direction ride on flat surfaces 73' and 72' of diagonally opposed rods 73 and 72, respectively, and rollers 26 oriented perpendicular thereto ride on flat surfaces 71' and 74' of diagonally opposed rods 71 and 74, respectively. Rollers 75 and 76 are spaced by keeper 77 constructed substantially as keeper 69.

All rollers in both the linear bearings 56 and 57 are of smaller length than diameter so that the ends of each roller clear the flat surfaces of the two diagonally opposed rods on which that particular roller does not ride. This is a requirement of both the linear bearings 56 and 57. It is preferred that the axes such as 67' and 68' of rollers which ride on different diagonally opposed rods lie in perpendicular planes and the flat surfaces on the four rods in the bearing define the four edges of a square as viewed from the end. Furthermore, in such a preferred embodiment all the rods in the bearing are identical and so the opposing channels on which the rods are contained define a square as viewed from the end. On the other hand, if the axes such as 67' and 68' do not lie in perpendicular planes, then the flat surfaces of the rods will not define the edges of a square as viewed from the end. In either case, however, it is essential that the diameter of a roller bearing be greater than the length thereof. It is preferred that all the rollers in both the linear bearings 56 and 57 are identical, all rods in both are identical and the keepers 77 and 69 are identical. Accordingly, these parts are interchangeable.

In operation, the rods adjust by the force of the rollers on the flats just as in the slide shown in FIGS. 1 and 2. The rods contained in the channels at the corners of the channels tend to turn about their axes making the diagonal flats parallel until the rollers are in flush contact with both diagonal flats. Thus, the flats which are the raceways are self adjusting.

The flats on two adjacent rods in the same channel (such as flats 65' and 66') define a self adjusting V raceway for the two sets of orthogonally oriented roller bearings 67 and 68. This V raceway can be replaced readily by merely sliding the rods from the member and inserting new rods.

By virtue of the preferred construction of the linear bearings 56 and 57 described above, there results in operation, regardless of the types and direction of loads on the device, no tendency for a roller bearing to roll on any axis except its own cylindrical axis. Assuming the base member 51 is to be fixed, loads transverse to the direction of slide and along a direction which is 45° counterclockwise to the up-down direction indicated by arrow 81 are all borne by the roller bearings 67 and 75 in the linear slides. Similarly, transverse loads at 45° clockwise to the up-down direction are all borne by roller bearings 68 and 76 in slides. Any transverse load can be broken down into vectors and so distributed between the rollers. However, there is no transverse load which will tend to cause a roller to roll about any axis except its own cylindrical axis and so slippage between a roller bearing surface and the flat surfaces upon which it rides is very unlikely.

The preload mechanism 58 in the embodiment described herein is located in the base member and consists of a slot 82 opening into the bottom of channel 63 of linear bearing 57. This slot is defined by two side walls 83' and 83" and a bottom surface 84. The slot is parallel to the direction of slide and extends a substantial length along the rods 71 and 72, the bottom of the slot 84 being entirely parallel to the rods. Fitting into this slot and extending the length of it are two matched tapered jibs, the fixed jib 85 and the adjustable jib 86. The matching tapered surfaces of these jibs 87 and 88, respectively, are contiguous and the match is such that the outside surface 89 of the fixed jib 85 which is contiguous with the bottom 84 of the slot and the outside surface 91 of the adjustable jib are entirely parallel to each other. The surface 91 contacts the two rods 71 and 72 contained in the channel 63 and so determines the horizontal position of these rods relative to the rods 63 and 74 in the opposing channel 64. Adjustment of the longitudinal position of the jib 86 adjusts the horizontal force on the rods 71 and 72 and so all the bearings 75 and 76 which bear on these rods are loaded and this loading is transmitted to linear bearing 56 as well.

Plates at the ends of linear bearings 56 and 57 restrain the longitudinal positions of the rods. Slide end plates such as 92 restrict the longitudinal positions of the rods 65, 66, 73, and 74 and plates such as 93 at the ends of the base member fix the longitudinal positions of the rods 63, 64, 71, and 72 contained in the base member. Screw stops such as 94 in the end plates 93 fix the position of the fixed jib 85. Adjusting screw 95 in one of the plates 93 abuts the adjustable jib 86 and moves it longitudinally to adjust the preload on the bearings.

A stop such as 46 at both ends of, for example, the base member raceways of each of the linear bearings limit longitudinal displacement of the cages relative to the base member and may prevent the cages and the rollers in each linear bearing from moving at all longitudinally relative to the base member. Similarly, the positions of the rollers relative to the slide could be limited by cage stops carried by the slide member rather than the base member. The function of the cages to space the roller bearings could be accomplished with balls or rollers of relatively soft material between the adjacent rollers. These spacers would not carry any load.

Stops can also be provided between the base and slide members to limit the extent of slide of the slide member relative to the base member.

The embodiments of the present invention described by the figures together incorporate all features of the invention and represent the best known uses of these features. Certain variations of these features and use of only some of these features to provide a linear slide can be made by those skilled in the field without deviating from the spirit and scope of the invention as set forth in the appended claims.

What is claimed is:

1. A slide bearing support apparatus including one member slidable on another member, the combination comprising:
   a pair of parallel slide bearing assemblies disposed between said members and each comprising;
   a pair of elongated, rectilinear rods having central axes parallel to each other, the longitudinal surfaces of each of said rods including an elongated curved portion and an oppositely directed coextending flat portion, said flat portions of said rods being spaced apart and facing each other to define an elongated rectilinear raceway;
   a plurality of rollers disposed in said raceway and contacting the flat portions on said rods; and
   rod support surfaces defined by each of said members, said support surfaces defined by said one member contacting the curved portion on one of said rods and said support surfaces defined by said another member contacting the curved portion on the other of said rods, and wherein said support surfaces are shaped so as to restrict movement of said rods in directions transverse their axes and to allow unrestrained rotational movement of the entire rods thereabout without creating torsional stresses in said rods.

2. An apparatus according to claim 1 wherein said support surfaces comprise a pair of planar surfaces tangent to said curved portions on said rods so as to establish therewith contact only along elongated lines parallel to the axes of said rods.

3. An apparatus according to claim 2 wherein said curved portions are circular and said lines of contact are spaced 90° apart thereon.

4. An apparatus according to claim 3 wherein said planar support surfaces are formed by rectangular grooves in said members.

5. An apparatus according to claim 4 wherein said one member is bifurcated and straddles the other member, and said grooves include longitudinally extending grooves in the side of each bifurcation face and opposed longitudinally extending grooves in the sides of the other member.

6. An apparatus according to claim 5 wherein said opposed rectangular grooves form an elongated, four cornered rectangular chamber, and one of said rods is positioned in each corner of said chamber with said flat portions on said rods facing the center of said chamber.

* * * * *